Aug. 27, 1946.  H. W. LENSNER  2,406,615
CARRIER-CURRENT RELAYING
Filed Dec. 8, 1942
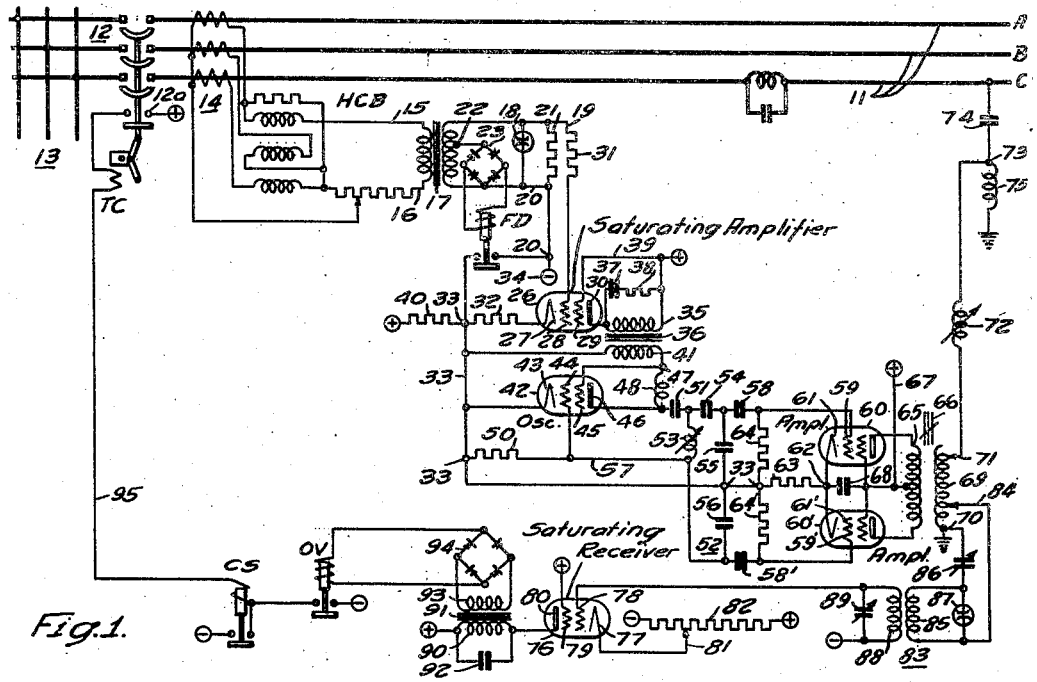
Fig. 1.
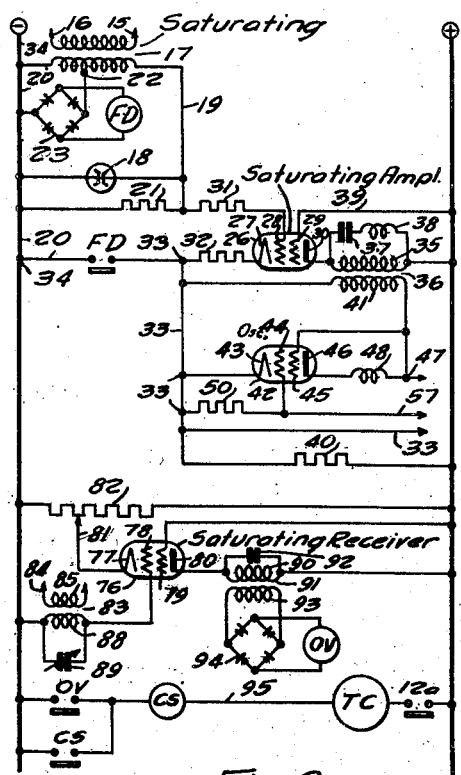
Fig. 2.
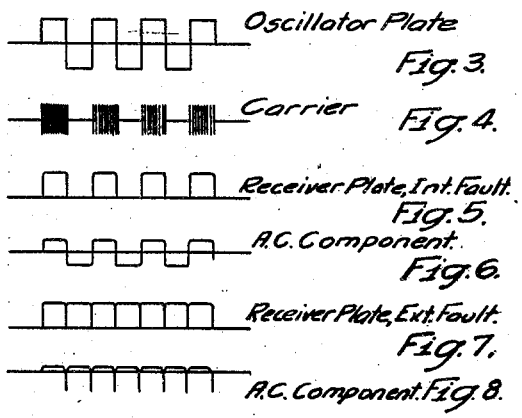
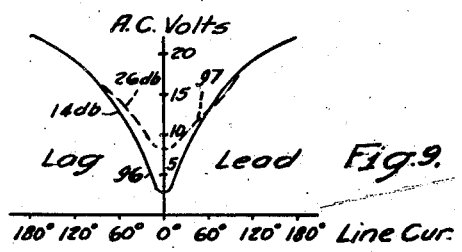
INVENTOR
Herbert W. Lensner.
BY
ATTORNEY Patented Aug. 27, 1946

2,406,615

UNITED STATES PATENT OFFICE 2,406,615

CARRIER-CURRENT RELAYING

Herbert W. Lensner, East Orange, N. J., assignor to Westinghouse Electric Corporation, East Pittsburgh, Pa., a corporation of Pennsylvania Application December 8, 1942, Serial No. 468,237

20 Claims. (Cl. 175—294)

My invention relates to protective relaying systems for alternating-current lines, and particularly to that type of protective system in which a comparison is made to determine the relative phase-angles between the line-currents at opposite ends of the protected line-section. More particularly, my invention relates to systems in which the alternate half-cycles of the line-current at one end of the line-section are compared with the alternate half-cycles of the line-current at the other end. My invention relates to improvements which are particularly adapted to means for effecting this alternate-half-cycle current-comparison through the medium of carrier-current superimposed upon the protected line-section.

Means have been known, heretofore, for causing carrier-current transmission during alternate half-cycles of the line-current at both ends of the protected line-section, as shown, for example, in a Lenehan Patent 2,275,971, granted May 10, 1942, and assigned to the Westinghouse Electric & Manufacturing Company. In this previously known system, however, the received carrier-current energy was utilized to restrain a differential relay, the operating-coil of which was intermittently energized in response to the alternate half-cycles of the line-current at the relaying point, so that the relay was forced to operate, within a time which was considerably less than a half-cycle, whenever the operating force derived from the relaying end of the line-section was not momentarily offset by an adequate receiver-current received by way of carrier from the alternate half-cycles of the line-current at the other end of the protected line-section.

When the protected transmission-line was a three-phase line, which is the usual case, advantage has been taken of any one of several known line-current deriving-means for deriving a single-phase line-frequency current which is compositely responsive to all of the phases of the polyphase line-current, as shown, for example, in the aforesaid Lenehan patent, which utilizes a so-called "type HCB" phase-sequence network which is described and claimed in a Harder Patent 2,183,646, granted December 19, 1939, and also assigned to the Westinghouse Electric & Manufacturing Company.

In the previously known relaying system as shown in the aforesaid Lenehan patent, difficulties have been encountered because of differences in saturation between the carrier-current equipment which furnished the half-waves from the other end of the protected section, and the line-current deriving-means which furnished the half-waves from the relaying end of the protected section. This previously known Lenehan system also suffered the disadvantage of utilizing a buzzing or intermittently operating tripping-relay which is supplied with alternate half-cycles of operating and restraining energy, upon the occurrence of a line-fault of a type and location requiring a tripping-operation of the relay.

The object of my present invention is to provide an improved form of half-cycle current-comparing type of relay-protection which is particularly adapted for carrier-current relaying, and which avoids the above-mentioned disadvantages of all previously available protective relaying systems of this type.

Among the more specific objects of my invention may be mentioned the utilization of a relay which responds to the overall magnitude of, or amount of energy in, a succession of half-waves of line-current derived from the two ends of a protected line-section, or a relay-response to the succession of half-cycle current-impulses, integrated over a period of time which is at least equal to considerably over one-half of a line-frequency cycle, so that the tripping-relay is supplied with a substantially continuous flow of operating-energy, thus avoiding buzzing or intermittent relay-operation. This integration of the intermittent current, or production of a constant or continuous relay-controlling force, is conveniently obtained by means of a rectifier, which smooths out the alternating-current pulsations, and produces a continuous current which may be made as free from ripples as may be desirable under all of the circumstances.

A second specific object of my invention may be cited as comprising the expedient of utilizing the intermittent or pulsating current, which is produced by combining the half-waves from the line-currents at the two ends of the protected section, as the sole discriminatory operating-source for producing an operating-force in the relay, as distinguished from a relay which utilizes these pulsatory currents in a restraint-element for at times blocking the operation of the relay under the influence of an intermittently energized operating-coil.

A still more specific object of my invention relates to a system of the type described, in which the received unipotential impulses derived from alternating half-cycles of the line-current of both ends of the protected section are modified so as to select only the alternating-current component thereof, and this alternating-current component is utilized to energize the tripping-relay. This feature can be utilized either with, or without, the intermediary of a rectifier for smoothing out the operating-force of the relay and for making it possible to utilize polarized, or direct-current, relays having a low energy-requirement.

A further object of my invention has to do with the utilization of the half-cycle carrier-current transmission at the relaying end of the line-section to derive the intermittent half-cycle line-current pulsations from said relaying end, as well as from the other end of the protected line-section, thereby avoiding previously encountered difficulties resulting from the differences in saturation between the carrier-current equipment and the line-current deriving-means, in previous systems in which the tripping relay was supplied with energy which was derived directly from the line-current deriving-means at the relaying end.

A still further object of my invention has to do with the provision of a novel carrier-controlling means utilizing a saturating amplifier-tube, excited in response to alternate half-cycles of the line-current, to produce substantially square-topped unipotential waves of plate-current energy for the oscillator-tube of the carrier-current transmitter, thus producing square-topped carrier-waves which have a magnitude which is substantially constant over a considerable range of operating conditions, the word "wave" being utilized here, and elsewhere in this specification, in a sense broad enough to include the idea of a block of electrical energy, whether unipotential or oscillatory. Where a saturated amplifier-tube is utilized to supply the plate-current energy for the oscillator, the saturating characteristics of this amplifier-tube may readily be caused to match the saturating characteristics of the saturating receiver-tube which is commonly utilized in carrier-current receivers for protective relaying apparatus.

With the foregoing and other objects in view, my invention consists in the combinations, systems, methods, apparatus, and parts of apparatus, hereinafter described and claimed, and illustrated in the accompanying drawing, wherein Fig. 1 is a diagrammatic view of circuits and apparatus illustrating an embodiment of my invention.

Fig. 2 is a schematic diagram of the direct-current connections, and

Figs. 3 to 9 are curve-diagrams which will be referred to in the explanation of my invention.

I have illustrated my invention as being applied to the protection of one end of a three-phase transmission-line section 11, the three phase-conductors being distinguished by the letters A, B and C. The line-section 11 is connected, through a circuit breaker 12, to a bus 13. As shown, the circuit breaker 12 is provided with a trip-coil TC and an auxiliary switch 12a, which opens during the opening-operation of the breaker. A line-current deriving-means is provided, in the form of a bank of line-current transformers 14, and a composite-phase network designated HCB, having output-terminals 15 and 16 in which there flows a derived single-phase line-frequency current. The derived current of the HCB network is supplied to the primary winding of a transformer 17 which may be of a saturated type for limiting the magnitude of the output under fault-current conditions. The magnitude of the transformer-output can be further limited by a voltage-limiting neon glow-tube 18, which is connected across the secondary terminals 19 and 20 of the saturating transformer 17, to cause the transformer-output to be in the form of substantially flat-topped waves of a magnitude which is substantially or approximately constant, within tolerable limits, over a considerable range of operating conditions. The output-terminals or secondary-circuit 19—20 of the transformer 17 are also preferably shunted by a constant or linear resistance 21.

In the illustrated form of embodiment of my invention, an intermediate tap 22 on the secondary winding of the network-transformer 17 is utilized to energize a rectifier-bridge 23 which, in turn, energizes a fault-detector FD having a make-contact which is sufficiently identified by being designated with the relay-designation FD. This particular fault-detector connection is intended to be representative of any suitable type of fault-detector.

In the illustrated embodiment of my invention, as shown, the output-terminals 19 and 20 of the line-current network-transformer 17 are utilized to energize a saturating amplifier-tube 26, illustrated as comprising a cathode 27, a grid 28, a screen 29, and an anode or plate 30. Thus, the amplifier-grid 28 is connected, through a resistance 31, to the transformer-terminal 19; while the amplifier-cathode 27 is connected, through a biasing resistor 32, to a cathode-circuit 33, and thence through the fault-detector contact FD, to the other transformer-terminal 20, which is also connected, at 34, to the negative terminal (—) of a suitable source of plate-current energy for the amplifier-tube 26. The amplifier-plate 30 is connected, through the primary winding 35 of a transformer 36, to the positive terminal (+) of the plate-voltage source. The primary winding 35 of the transformer 36 is shunted by a capacitor 37 and a resistor 38 which assist in controlling the wave-form of the current in the transformer 36, so as to give this wave-form a substantially flat-topped shape. The amplifier-screen 29 is also connected to the positive battery-terminal (+) as shown at 39. The amplifier-tube 26 is preferably operated in its saturating range of current-values, so that whenever its grid 28 reaches a critical potential which is not too negative with respect to said cathode, the plate-current will rapidly rise to its saturated, or substantially constant, steady-state value.

The cathode-circuit 33 of the saturating amplifier-tube 26 is normally biased to a positive potential, by being connected to the positive terminal (+) through a resistor 40, so that the amplifier-tube 26 is normally inoperative. When the fault-detector FD responds, it shifts the potential of the cathode-circuit 33 to negative, by connecting said circuit directly to the negative bus (—), thus applying the bus-potential to the anode-cathode circuit of the tube, so that the tube will pass current, except when its grid 28 is made sufficiently negative by reason of the voltage impressed on it from the output-terminals 19—20 of the line-current network-transformer 17.

The flat-topped unipotential waves of plate-current of the saturating amplifier 26 are delivered, through the secondary winding 41 of the transformer 36 to the oscillator-tube 42 of a carrier-current transmitter, to serve as a source of plate-current energy, or plate-voltage, therefor. The oscillator-tube 42 is illustrated as having a cathode 43, a grid 44, a screen 45 and a plate or anode 46. One terminal 47 of the transformer-secondary 41 is connected, through a high-frequency choke-coil 48, to the anode 46 of the oscillator-tube 42. The oscillator-cathode 43 is directly connected to the cathode-circuit 33 of the saturating amplifier 26, so that this cathode-circuit 33 is also the cathode-circuit of the oscillator-tube 42. The oscillator-grid is connected to this cathode-circuit 33 through a grid-resistor 50. The plate-circuit terminal 47 of the transformer-secondary 41 is directly connected to the oscillator-screen 45. The oscillator-plate 46 is also connected, through a blocking-capacitor 51, to a tuned circuit 52 which comprises a variometer 53 and three capacitors 54, 55 and 56, all connected in series with each other in a closed circuit. One terminal of the variometer 53 is connected to the blocking capacitor 51, while the other terminal of the variometer 53 is connected to the oscillator-grid 44 as shown at 57.

The junction-point between the two capacitors 55 and 56 of the tuned oscillator-circuit 52 is directly connected to the cathode-circuit 33. These two capacitors 55 and 56 are matched capacitors, utilized as sources of equal radio-frequency voltages, their other terminals being connected, through blocking-capacitors 58 and 58', respectively, to the grids 59, 59' of two push-pull amplifier tubes 60, 60'. The cathodes 61, 61' of the two amplifier-tubes 60, 60' are connected together at 62, and connected to the cathode-circuit 33 through a biasing resistor 63. The two amplifier-grids 59 and 59' are similarly connected to the cathode-circuit 33 through two grid-resistors 64 and 64'. The plates of the amplifier-tubes 60, 60' are connected to the respective terminals of the primary winding 65 of a radio-frequency transformer 66. The transformer-primary 65 has a midpoint-tap which is connected, at 67, to the positive battery-terminal (+), which is also connected to the screens of the two amplifier-tubes 60, 60'. The midpoint-tap 67 is also coupled to the two amplifier-cathodes 61, 61', through a blocking-capacitor 68.

The output of the radio-frequency transformer 66 is coupled to one of the conductors C of the protected line-section 11, by means of a secondary winding 69 of said radio-frequency transformer. One terminal 70 of this secondary winding 69 is grounded, and a tap 71 is provided to energize a variometer 72 which is connected, at 73, to a coupling-capacitor 74 which is connected to the phase-C line-conductor. The connecting-point 73 is also connected to ground through a choke-coil 75.

In addition to the carrier-current transmitter, which has just been described, I also provide a carrier-current receiver, which is illustrated as comprising a saturating receiver-tube 76, having a cathode 77, a grid 78, a screen 79, and a plate or anode 80. The receiver-cathode 77 is connected, at 81, to a suitable source of negative potential, indicated as being a tap on a potentiometer 82 which is energized from the battery-terminals (+) and (—). The receiver-grid 78 is energized, through a coupling-transformer 83, from a tap 84 on the secondary winding 69 of the radio-frequency transformer 66. Thus, one terminal of the primary winding 85 of the coupling-transformer 83 is connected to the tap-point 84, while the other terminal of said primary winding is connected to the ground-point 70 through a tuning-capacitor 86. The primary winding 85 is also shunted by a voltage-limiting neon glow-tube 87. The secondary winding 88 of the coupling-transformer 83 has one of its terminals connected to the negative battery-terminal (—), while the other terminal of said secondary winding is connected to the receiver-grid 78. This secondary winding 88 is also shunted by a tuning-capacitor 89.

The receiver-anode 80 is connected to the positive bus (+) through the primary winding 90 of a coupling-transformer 91, which is designed to segregate, or selectively respond to, the alternating-current component of the plate-current of the receiver. If desired, the coupling-transformer 91 may be made to respond to a selected one of the alternating-current components of the receiver plate-current, but I have illustrated it in the simplest possible form, as simply responding to the alternating-current component or components, substantially all of them, to the exclusion of the direct-current component, the latter being ineffective to produce any transformer-voltage in the transformer. A high-frequency by-passing capacitor 92 is connected in shunt around the primary winding 90 to provide a path for the radio-frequency current and keep it out of the transformer.

The coupling transformer 91 has a secondary winding 93, which is utilized to energize an overvoltage relay OV, which is designed to respond to the amount of energy in the segregated alternating-current component, integrated over a complete cycle, or over a period of time which is at least equal to considerably over one-half of a line-frequency cycle, so as to respond to the magnitude of this alternating-current component, or to either an average value or a root-mean-square value of this component. I prefer to utilize a rectifier-means, which is symbolically illustrated as a rectifier-bridge 94, which is interposed between the secondary winding 93 and the operating-coil of the overvoltage relay OV. This rectifier serves as a means for more or less smoothing out the pulsations which are typical of the alternating-current energy, and produce a fairly smooth or continuous voltage or energy-source for energizing the overvoltage relay OV, while at the same time making it possible to utilize any one of a number of well-known types of sensitive direct-current relays for the overvoltage relay OV, thus reducing the energy-requirement or drain on the anode-circuit of the receiver 76.

The overlying relay OV is illustrated as being directly utilized as a tripping relay, having a make-contact which is sufficiently distinguished by being designated with the relay-designation OV. This OV make-contact is illustrated as being connected between the negative battery-terminal (—) and the trip-circuit 95, through the serially connected operating-coil of a contactor-switch CS which has make-contacts which seal in, and close a bypassing-circuit around the delicate OV contacts. The trip-circuit 95 energizes the tripping-coil TC of the line circuit-breaker 12, through the auxiliary breaker-switch 12a, the circuit being completed at the positive battery-terminal (+).

The operation of the illustrated embodiment of my invention may now be described. The current-transformers 14 and the phase-sequence-selecting network HCB derive a line-frequency current from the illustrated end of the protected line-section 11. It will be understood that the same or similar equipment will be utilized at both ends of the protected line-section, only one end being illustrated. The single-phase line-current-responsive voltage appearing across the network-terminals 15—16 is preferably modified so as to have both a limited amplitude or magnitude and a square-topped wave-form, these limiting functions being performed by reason of the saturating characteristic of the network-transformer 17, and the voltage-limiting characteristic of the neon glow-lamp 18, the result of which is to produce, in the output-terminals 19—20, a substantially square-topped alternating-current wave-form which is of a magnitude which remains substantially or workably constant through a considerable operating-range of various magnitudes of fault-currents, so as to respond fairly uniformly to line-faults of different types and severity.

During normal line-conditions, that is, when there is no fault on the transmission-line, the protective equipment is inoperative. The open fault-detector contact FD keeps the cathode 27 of the saturating-amplifier 26 disconnected from the negative terminal of its plate-voltage source, while the said cathode 27 is held at the potential of the positive battery-terminal (+), by reason of the resistance-connection 40. At the same time, the open fault-detector contact FD performs a similar service for the two amplifier-tubes 60, 60' of the carrier-current transmitter, so that no current is being passed through these tubes. The oscillator-tube 42 is inoperative, under these conditions, because it receives no plate-circuit energy from the transformer 36 which is coupled to the saturating amplifier 26. At the same time, that is, during standby conditions for the carrier-current equipment, when there is no fault on the transmission line, the receiver-tube 76 is held in an inoperative condition, so that it passes no plate-current, by reason of the fact that its grid 78 is held at a potential more negative than its cathode 77, the grid being connected directly to the negative terminal (—) through the low resistance of the secondary winding 88, while the cathode 77 is connected to a more positive potential on the potentiometer 82.

When a fault occurs on the transmission line, either within the limits of the protected line-section 11, or outside of said section, it is preferable to utilize a sensitive fault-detector, symbolized by the element FD, to apply plate-voltage to the tubes 26, 60 and 60', by the closure of the fault-detector contact FD, and at the same time to connect the output-terminals 19—20 of the line-current deriving-means in a circuit between the grid and the cathode of the saturating amplifier-tube 26, so that the alternating-current voltage of the line-current deriving-means may be impressed upon the amplifier grid 28. The negative half-cycles of this voltage make the grid more negative with respect to the cathode, and block the flow of plate-current through the tube, but the positive half-cycles are selectively responded to by the tube, to cause the flow of the saturation-current of the tube, or the maximum current which the tube is capable of passing through its anode-cathode circuit. This produces a square-topped current-wave which may be applied directly to the oscillator-tube 42, but is shown as being applied thereto through a voltage-changing transformer 36. The oscillator-tube 42 thereupon receives plate-circuit energy during alternate half-cycles of the line-frequency current, impressing carrier-current energy on the line through the line-coupling capacitor 74.

The receiver 76 receives or responds to all of the carrier-current which is impressed upon the protected line-section 11, either at the relaying end, which is illustrated, or at the other end of the line-section, which is not illustrated, but which is a duplicate of the end shown. The receiver-tube 76 is also operated in a saturating range, so that any plate-current which it passes will, in general, be the saturating current, or the maximum current which the tube is capable of passing, the tube quickly achieving this saturated condition soon after its grid-voltage is built up, in the positive direction, beyond the value at which the tube first commences to conduct any current at all. The tube is protected, and also assisted in its function of holding its output-current to a constant saturation-value, by the excess-voltage neon glow-tube 87 in the radio-frequency input-circuit of the tube, which serves to prevent extreme excesses of radio-frequency input-energy when the receiver-tube is responding to the radio-frequency output of the adjacent transmitter at the same station as the receiver.

The operation is illustrated in Figs. 3 to 9. Fig. 3 shows the oscillator plate-voltage which is impressed upon the anode-cathode circuit of the oscillator tube 42 by the coupling-transformer 36 which is energized from the saturating amplifier 26. This causes carrier-current to be generated, and transmitted onto the line-section, during the positive half-cycles of the oscillator plate-voltage, as shown in Fig. 4.

If the fault is an internal fault, that is, one located within the confines of the protected line-section 11, carrier-current is sent out, or transmitted, on the same half-cycle from both ends, and this is received at both ends, since both of the transmitters operate on the same carrier-current frequency, and, of course, the receivers are tuned to that frequency. Under these internal-fault conditions, the receiver plate-current consists of a succession of flat-topped unipotential half-waves, occurring on alternate half-cycles of the line-frequency current, as shown in Fig. 5. The alternating-current component of this receiver-current is delivered by the alternating-current-segregating transformer 91, as shown in Fig. 6, which represents the current or voltage to which the overvoltage tripping-relay OV responds, it being understood that this overvoltage relay responds to a predetermined overall or integrated magnitude of this alternating-current component, rather than to the individual half-cycles of the alternating-current pulsations.

During an external fault, that is, a fault located outside of the protected line-section 11, the line current enters the line-section at one end, and leaves it at the other end, so that the two carrier-current transmitters transmit on alternate half-cycles of the line-current frequency, so that the grid 78 of the carrier-current receiver 76 receives carrier-current energy substantially continuously, producing a receiver plate-current which is substantially a constant direct current, being illustrated, in Fig. 7, as dropping to zero for a very brief instant at the end of each half-cycle of the line-frequency current. The alternating-current component of this receiver-current is very small, as shown in Fig. 8, and its average value, which is obtained by means of the rectifier 94, is also very small, even though the alternating-current component may have very brief negative peaks as shown in Fig. 8. The average value of this alternating-current component, during external faults, is below the setting of the overvoltage relay OV, and hence produces no relay-operation.

While I have discussed the ideal case in which the fault-currents which appear in the protected line-section at the respective ends thereof are either absolutely in phase with each other, or exactly 180° out of phase with each other, my relaying system is accurately operative for the intermediate phase-angle conditions between these extremes, which are obtained under certain conditions in actual practice. Thus, Fig. 9 shows the root-mean-square voltage which is produced in the receiver-current segregating-transformer 91, as the line-current at the opposite end of the protected line-section varies in phase-angle with respect to the line-current at the relaying end. When the two line-currents are 180° out of phase with each other, that is, with current flowing into the line-section at both ends thereof, which is the condition for an internal fault, the transformer secondary-voltage, or the alternating-current component of the receiver plate-current, is a maximum as shown in Fig. 6 and at the 180° points in Fig. 9. As the phase-angle between the two-line currents at opposite ends of the protected section becomes less and less, the plate-current of the receiver continues to be a succession of discrete, flat-topped unipotential waves, each wave having a time-phase and a duration dependant upon the phase-angle between the line-currents, starting with a duration of substantially one line-frequency half-cycle, as shown in Fig. 5, and changing to a duration only slightly less than two line-frequency half-cycles, as shown in Fig. 7, when the line-current phase-angle becomes zero, which is the condition for an external fault. At the same time, the secondary-voltage of the segregating-transformer 91 gradually changes, until it reaches a minimum value when the two line-currents are in phase with each other, corresponding to an external-fault condition, as shown at the 0° point in Fig. 9.

Fig. 9 also shows that the response is not affected by the line-attenuation to the carrier-current signal which is received from the far end of the protected line-section. Thus, two curves, 96 and 97, are shown, the full-line curve 96 representing the response obtained when the carrier-current impulses received from the opposite end of the line-section are strong, with only a 14-decibal attenuation, while the dotted curve 97 shows the alternating-current receiver-component for a greater attenuation of 26 decibels. The over-voltage relay OV may readily be adjusted to trip when the phase-difference between the two line-currents reaches any desired value. For example, if the pick-up point of the over-voltage relay is set for about 17 volts, RMS, corresponding to approximately a 90-degree phase-angle between the line-currents at the opposite ends of the protected line-section, the response of the overvoltage relay will be substantially independent of the line-attenuation, for all values of attenuation under 26 decibels.

While I have illustrated my invention in a single preferred form of embodiment, and while I have explained it in accordance with my best present understanding of its operating-principles, I wish it to be understood that my invention is by no means limited to this precise form of embodiment, nor do I care to limit it absolutely to the extent of my present understanding of the same. I desire, therefore, that the appended claims shall be accorded the broadest construction consistent with their language.

I claim as my invention:

1. A protective relaying system, comprising the combination, with an alternating-current transmission-line section having circuit-interrupting means to be protectively controlled, of protecting relaying-apparatus including line-current deriving-means at each end of the line-section for deriving a line-frequency current from that end of the line-section, means for at times selectively producing, at at least one and the same end of the line-section, a succession of discrete impulses of electrical energy in response to alternate half-cycles of the two line-frequency currents which are derived from the two ends of the line-section, each half-cycle response being responsive to a substantially full half-cycle of the current which controls that response, and a relay means, at at least one end of the line-section, responsive to a predetermined condition of said succession of discrete impulses of electrical energy, integrated over a period of time which is at least equal to considerably over one-half of a line-frequency cycle, for exercising a control over the circuit-interrupting means at its end of the line-section.

2. A protective relaying system, comprising the combination, with an alternating-current transmission-line section having circuit-interrupting means to be protectively controlled, of protecting relaying-apparatus including line-current deriving-means at each end of the line-section for deriving a line-frequency current from that end of the line-section, means for at times selectively producing, at at least one and the same end of the line-section, a succession of discrete impulses of electrical energy in response to alternate half-cycles of the two line-frequency currents which are derived from the two ends of the line-section, each half-cycle response being responsive to a substantially full half-cycle of the current which controls that response, rectifier-means at at least one end of the line-section, energized from said succession of discrete impulses, and means having a control-circuit energized from said rectifier-means for exercising a control over the circuit-interrupting means at its end of the line-section.

3. A protective relaying system, comprising the combination, with an alternating-current transmission-line section having circuit-interrupting means to be protectively controlled, of protecting relaying-apparatus including line-current deriving-means at each end of the line-section for deriving a line-frequency current from that end of the line-section, means for at times selectively producing, at at least one and the same end of the line-section, a succession of discrete impulses of electrical energy in response to alternate half-cycles of the two line-frequency currents which are derived from the two ends of the line-section, each half-cycle response being responsive to a substantially full half-cycle of the current which controls that response, and a relay-means, at at least one end of the line-section, for exercising a control over the circuit-interrupting means at its end of the line-section, characterized by said relay-means having a relay-actuating control-means for developing a relay-operating force sufficient to change the relay-means from a normal inactive condition to an actuated operative condition in response to a predetermined variation in said succession of discrete impulses of electrical energy as a result of variations in the phase-angle relation between the line-frequency currents which are derived from opposite ends of the line section.

4. A protective relaying system, comprising the combination, with an alternating-current transmission-line section having circuit-interrupting means to be protectively controlled, of protecting relaying-apparatus including line-current deriving-means at each end of the line-section for deriving a line-frequency current from that end of the line-section, means for at times selectively producing, at at least one and the same end of the line-section, a succession of discrete impulses of electrical energy in response to alternate half-cycles of the two line-frequency currents which are derived from the two ends of the line-section, each half-cycle response being responsive to a substantially full half-cycle of the current which controls that response, and a relay-means, at at lease one end of the line-section, for exercising a control over the circuit-interrupting means at its end of the line-section, characterized by said relay-means having a source of relay-controlling electrical energy which is obtained from said succession of discrete impulses of electrical energy and from no other derived line-currents.

5. A protective relaying system, comprising the combination, with an alternating-current transmission-line section having circuit-interrupting means to be protectively controlled, of protecting relaying-apparatus including line-current deriving-means at each end of the line-section for deriving a line-frequency current from that end of the line-section, means including current-limiting means at each end of the line-section for at times selectively producing, at at least one and the same end of the line-section, a succession of substantially flat-topped waves, of a magnitude which is substantially constant over a considerable range of operating conditions, in response to alternate half-cycles of the line-frequency current which is derived from its own end of the line-section, each half-cycle response being responsive to a substantially full half-cycle of the current which controls that response, means, at at least one end of the line-section, for combining the waves which are derived from the two ends of the line-section, and a relay-means responsive to a predetermined condition of the combined waves, integrated over a period of time which is at least equal to considerably over one-half of a line-frequency cycle, for exercising a control over the circuit-interrupting means at its end of the line-section.

6. A protective relaying system, comprising the combination, with an alternating-current transmission-line section having circuit-interrupting means to be protectively controlled, of protecting relaying-apparatus including line-current deriving-means at each end of the line-section for deriving a line-frequency current from that end of the line-section, current-limiting means at each end of the line-section for at times selectively producing a succession of substantially flat-topped waves, of a magnitude which is substantially constant over a considerable range of operating conditions, in response to alternate half-cycles of the line-frequency current which is derived from its own end of the line-section, means, at at least one end of the line-section, for combining the waves which are derived from the two ends of the line-section, means for substantially segregating an alternating-current component from another component or components of the combined waves, and means selectively responsive to the segregated alternating-current component for exercising a control over the circuit-interrupting means at its end of the line-section.

7. A protective relaying system, comprising the combination, with an alternating-current transmission-line section having circuit-interrupting means to be protectively controlled, of protecting relaying-apparatus including line-current deriving-means at each end of the line-section for deriving a line-frequency current from that end of the line-section, means including current-limiting means at each end of the line-section for at times selectively producing, at at least one and the same end of the line-section, a succession of substantially flat-topped waves, of a magnitude which is substantially constant over a considerable range of operating conditions, in response to alternate half-cycles of the line-frequency current which is derived from its own end of the line-section, each half-cycle response being responsive to a substantially full half-cycle of the current which controls that response, means, at at least one end of the line-section, for combining the waves which are derived from opposite ends of the line-section so that the waves are all in the same polarity, and a relay-means responsive to a predetermined condition of the combined waves, integrated over a period of time which is at least equal to considerably over one-half of a line-frequency cycle, for exercising a control over the circuit-interrupting means at its end of the line-section.

8. A protective relaying system, comprising the combination, with an alternating-current transmission-line section having circuit-interrupting means to be protectively controlled, of protecting relaying-apparatus including line-current deriving-means at each end of the line-section for deriving a line-frequency current from that end of the line-section, current-limiting means at each end of the line-section for at times selectively producing a succession of substantially flat-topped waves, of a magnitude which is substantially constant over a considerable range of operating conditions, in response to alternate half-cycles of the line-frequency current which is derived from its own end of the line-section, means for combining the waves which are derived from opposite ends of the line-section so that the waves are all in the same polarity, means for substantially segregating an alternating-current component from the direct-current component of the combined waves, and means selectively responsive to the segregated alternating-current component for exercising a control over the circuit-interrupting means at its ends of the line-section.

9. The invention as defined in claim 8, characterized by the substantially flat-topped waves which are derived from the respective ends of the line-section being each of a duration of approximately one-half of a line-frequency cycle.

10. A protective relaying system, comprising the combination, with an alternating-current transmission-line section having circuit-interrupting means to be protectively controlled, of protecting relaying-apparatus including line-current deriving-means at each end of the line-section for deriving a line-frequency current from that end of the line-section, means including means at each end of the line-section for at times selectively producing, at at least one and the same end of the line-section, a succession of discrete impulses of electrical energy in response to alternate half-cycles of the line-frequency current which is derived from its own end of the line section, each half-cycle response being responsive to a substantially full half-cycle of the current which controls that response, current-limiting means, at at least the aforesaid end of the line-section, for combining the impulses which are derived from the opposite ends of the line-section and for deriving substantially flat-topped unipotential waves of a magnitude which is substantially constant whenever said impulses exist, over a considerable range of operating conditions, the relative phases and durations of the substantially flat-topped unipotential waves being dependent upon the phase-angle relation between the line-frequency currents which are derived from opposite ends of the line-section, and a relay-means responsive to a predetermined condition of said substantially flat-topped unipotential waves, integrated over a period of time which is at least equal to considerably over one-half of a line-frequency cycle, for exercising a control over the circuit-interrupting means at its end of the line-section.

11. A protective relaying system, comprising the combination, with an alternating-current transmission-line section having circuit-interrupting means to be protectively controlled, of protecting relaying-apparatus including line-current deriving-means at each end of the line-section for deriving a line-frequency current from that end of the line-section, means at each end of the line-section for at times selectively producing a succession of discrete impulses of electrical energy in response to alternate half-cycles of the line-frequency current which is derived from its own end of the line-section, current-limiting means for combining the impulses which are derived from the opposite ends of the line-section and for deriving substantially flat-topped unipotential waves of a magnitude which is substantially constant over a considerable range of operating conditions, the relative phases and durations of the substantially flat-topped unipotential waves being dependent upon the phase-angle relation between the line-frequency currents which are derived from opposite ends of the line-section, means for substantially segregating an alternating-current component from the direct-current component of the substantially flat-topped unipotential waves, and means selectively responsive to the segregated alternating-current component for exercising a control over the circuit-interrupting means at its end of the line-section.

12. A carrier-current protective relaying system, comprising the combination, with an alternating-current transmission-line section having circuit-interrupting means to be protectively controlled, of protecting relaying-apparatus including two carrier-current transmitter-means of approximately the same carrier-current frequency disposed one at each end of the line-section, line-current deriving-means at each end of the line-section for deriving a line-frequency current from that end of the line-section, carrier-controlling means for at times causing each transmitter to impress carrier-current energy on the line-section in a succession of substantially flat-topped waves, of a magnitude which is substantially constant over a considerable range of operating conditions, in response to alternate half-cycles of the line-frequency current which is derived from its own end of the line-section, each half-cycle response being responsive to a substantially full half-cycle of the current which controls that response, carrier-current receiver-means at at least one end of the line-section, responsive to the carrier-current energy impressed on the line-section from both transmitters for deriving substantially flat-topped unipotential waves of a magnitude which is substantially constant during periods whenever carrier-current energy is being received, over a considerable range of operating conditions, the relative phases and durations of the substantially flat-topped unipotential waves being dependent upon the phase-angle relation between the line-frequency currents which are derived from opposite ends of the line-section, and a relay-means responsive to a predetermined condition of said substantially flat-topped unipotential waves, integrated over a period of time which is at least equal to considerably over one-half of a line-frequency cycle, for exercising a control over the circuit-interrupting means at its end of the line-section.

13. A carrier-current protective relaying system, comprising the combination, with an alternating-current transmission-line section having circuit-interrupting means to be protectively controlled, of protecting relaying-apparatus including two carrier-current transmitter-means of approximately the same carrier-current frequency disposed one at each end of the line-section, line-current deriving-means at each end of the line-section for deriving a line-frequency current from that end of the line-section, carrier-controlling means for at times causing each transmitter to impress carrier-current energy on the line-section in a succession of substantially flat-topped waves, of a magnitude which is substantially constant over a considerable range of operating conditions, in response to alternate half-cycles of the line-frequency current which is derived from its own end of the line-section, each half-cycle response being responsive to a substantially full half-cycle of the current which controls that response, carrier-current receiver-means at at least one end of the line-section, responsive to the carrier-current energy impressed on the line-section from both transmitters for deriving substantially flat-topped unipotential waves of a magnitude which is substantially constant during periods whenever carrier-current energy is being received, over a considerable range of operating conditions, the relative phases and durations of the substantially flat-topped unipotential waves being dependent upon the phase angle relation between the line-frequency currents which are derived from opposite ends of the line-section, rectifier-means energized from said substantially flat-topped unipotential waves, and means having a control-circuit energized responsively to said rectifier-means for exercising a control over the circuit-interrupting means at its end of the line-section.

14. A carrier-current protective relaying system, comprising the combination, with an alternating-current transmission-line section having circuit-interrupting means to be protectively controlled, of protecting relaying-apparatus including two carrier-current transmitter-means of approximately the same carrier-current frequency disposed one at each end of the line-section, line-current deriving-means at each end of the line-section for deriving a line-frequency current from that end of the line-section, carrier-controlled means for at times causing each transmitter to impress carrier-current energy on the line-section in a succession of substantially flat-topped waves, of a magnitude which is substantially constant over a considerable range of operating conditions, in response to alternate half-cycles of the line-frequency current which is derived from its own end of the line-section, each half-cycle response being responsive to a substantially full half-cycle of the current which controls that response, carrier-current receiver-means, at at least one end of the line-section, responsive to the carrier-current energy impressed on the line-section from both transmitters for deriving substantially flat-topped unipotential waves of a magnitude which is substantially constant during periods whenever carrier-current energy is being received, over a considerable range of operating conditions, the relative phases and durations of the substantially flat-topped unipotential waves being dependent upon the phase-angle relation between the line-frequency currents which are derived from opposite ends of the line-section, and a relay-means for exercising a control over the circuit-interrupting means at its end of the line-section, characterized by said relay-means having a relay-actuating control-means for developing a relay-operating force sufficient to change the relay-means from a normal inactive condition to an actuated operative condition in response to a predetermined variation in said substantially flat-topped unipotential waves as a result of variations in the phase-angle relation between the line-frequency currents which are derived from opposite ends of the line-section.

15. A carrier-current protective relaying system, comprising the combination, with an alternating-current transmission-line section having circuit-interrupting means to be protectively controlled, of protecting relaying-apparatus including two carrier-current transmitter-means of approximately the same carrier-current frequency disposed one at each end of the line-section, line-current deriving-means at each end of the line section for deriving a line-frequency current from that end of the line-section, carrier-controlling means for at times causing each transmitter to impress carrier-current energy on the line-section in a succession of substantially flat-topped waves, of a magnitude which is substantially constant over a considerable range of operating conditions, in response to alternate half-cycles of the line-frequency current which is derived from its own end of the line-section, each half-cycle response being responsive to a substantially full half-cycle of the current which controls that response, carrier-current receiver-means, at at least one end of the line-section, responsive to the carrier-current energy impressed on the line-section from both transmitters for deriving substantially flat-topped unipotential waves of a magnitude which is substantially constant during periods whenever carrier-current energy is being received, over a considerable range of operating conditions, the relative phases and durations of the substantially flat-topped unipotential waves being dependent upon the phase-angle relation between the line-frequency currents which are derived from opposite ends of the line-section, and a relay-means for exercising a control over the circuit-interrupting means at its end of the line-section, characterized by said relay-means having a source of relay-controlling electrical energy which is obtained from said substantially flat-topped unipotential waves and from no other derived line-currents.

16. A carrier-current protective relaying system, comprising the combination, with an alternating-current transmission-line section having circuit-interrupting means to be protectively controlled, of protecting relaying apparatus including two carrier-current transmitter-means of approximately the same carrier-current frequency disposed one at each end of the line-section, line-current deriving-means at each end of the line-section for deriving a line-frequency current from that end of the line-section, carrier-controlling means for at times causing each transmitter to impress carrier-current energy on the line-section in a succession of substantially flat-topped waves of a magnitude which is substantially constant over a considerable range of operating conditions, in response to alternate half-cycles of the line-frequency current which is derived from its own end of the line-section, carrier-current receiver-means responsive to the carrier-current energy impressed on the line-section from both transmitters for deriving substantially flat-topped unipotential waves of a magnitude which is substantially constant over a considerable range of operating conditions, the relative phases and durations of the substantially flat-topped unipotential waves being dependent upon the phase-angle relation between the line-frequency currents which are derived from opposite ends of the line-section, means for substantially segregating an alternating-current component from the direct-current component of the substantially flat-topped unipotential waves, and means selectively responsive to the segregated alternating-current component for exercising a control over the circuit-interrupting means at its ends of the line-section.

17. A carrier-current protective relaying system, comprising the combination, with an alternating-current transmission-line section having circuit-interrupting means to be protectively controlled, of protecting relaying-apparatus including carrier-current transmitter-means and receiver-means, line-current deriving-means for deriving a line-frequency current from the line-section, carrier-controlling means, including a saturating amplifier-tube having a control-circuit energized responsively to alternate half-cycles of said derived line-frequency current, for at times causing the transmitter-means to impress carrier-current energy on the line-section in a succession of substantially flat-topped waves, of a magnitude which is substantially constant over a considerable range of operating conditions, said receiver-means including a saturating receiver-tube for producing a succession of discrete receiver-current impulses in response to received carrier-current energy-waves, and means responsive to said receiver-current impulses for utilizing said receiver-current impulses in exercising a control over the circuit-interrupting means at its ends of the line-section, said saturating amplifier-tube and said saturating receiver-tube both having the property of producing substantially square-topped waves of unipotential current at a magnitude which is substantially constant over a considerable range of operating conditions.

18. A carrier-current protective relaying system, comprising the combination, with at least one end of an alternating-current transmission-line section having circuit-interrupting means to be protectively controlled, of protecting relaying-apparatus including carrier-current transmitter-means and receiver-means coupled to said line-section, said transmitter-means being of an oscillator-tube type, line-current deriving-means for deriving a line-frequency current from the line-section, carrier-controlling means, including a saturating amplifier-tube having a control-circuit energized responsively to alternate half-cycles of said derived line-frequency current, for at times producing substantially square-topped waves of unipotential plate-current energy for the transmitter-means, said receiver-means including a saturating receiver-tube for producing substantially flat-topped unipotential waves of a magnitude which is substantially constant over a considerable range of operating conditions, and means responsive to said receiver-current impulses for utilizing said receiver-current impulses in exercising a control over the circuit-interrupting means at its end of the line-section.

19. Carrier-current controlling-means for an alternating-current line-section having a variable line-current of a substantially constant line frequency, comprising the combination, with a carrier-current transmitter, of means for at times deriving line-frequency voltage-impulses of a substantially constant magnitude from the variable line-current, an amplifier-tube having a control-circuit and a plate-circuit, means for at times utilizing said voltage-impulses to control the energization of said control-circuit in such manner as to cause said amplifier-tube to operate in a saturated manner, and means for utilizing the plate-current of the amplifier-tube in causing an intermittent transmission of carrier-current from said transmitter to said line-section in a succession of transmitting periods each having a duration of the order of a half-cycle of the line-current.

20. Carrier-current controlling-means for an alternating-current line-section, comprising the combination, with an oscillator-tube type of carrier-current transmitter coupled to the line-section, of means for at times deriving voltage-impulses of a substantially constant magnitude from the line-current, an amplifier-tube having a control-circuit and a plate-circuit, means for at times utilizing said voltage-impulses to control the energization of said control-circuit in such manner as to cause said amplifier-tube to operate in a saturated manner, and means for at such times utilizing the plate-current of the amplifier-tube as a source of plate-circuit energy for the oscillator-tube of the carrier-current transformer.

HERBERT W. LENSNER.